Feb. 5, 1963   J. C. ABBEY ETAL   3,076,486
AUTOMATIC SHUT-OFF-VALVE
Filed July 6, 1959   2 Sheets-Sheet 2
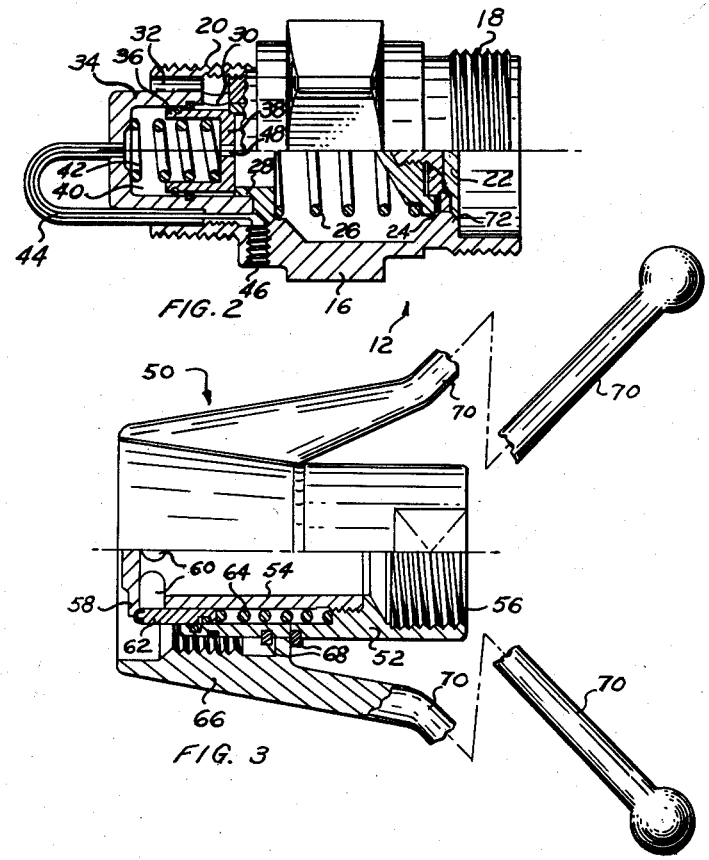
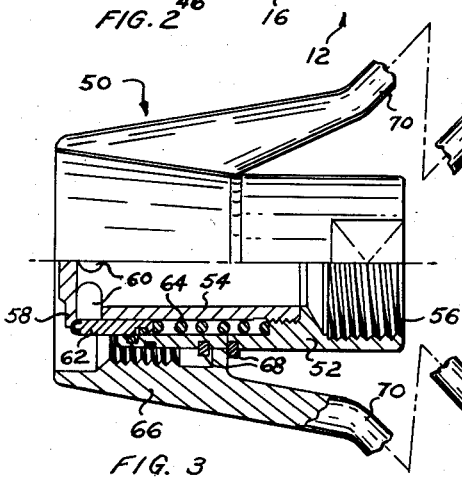
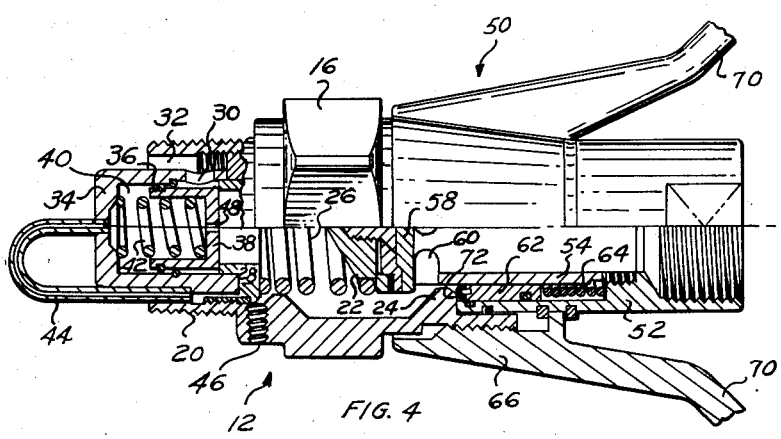
INVENTOR
JOHN C. ABBEY
THEADORE E. UPHAM
BY
ATTORNEY 3,076,486
AUTOMATIC SHUT-OFF VALVE
John C. Abbey, Parma, and Theadore E. Upham, Cement City, Mich., assignors to Aeroquip Corporation, Jackson, Mich., a corporation of Michigan
Filed July 6, 1959, Ser. No. 825,067
2 Claims. (Cl. 141—207)

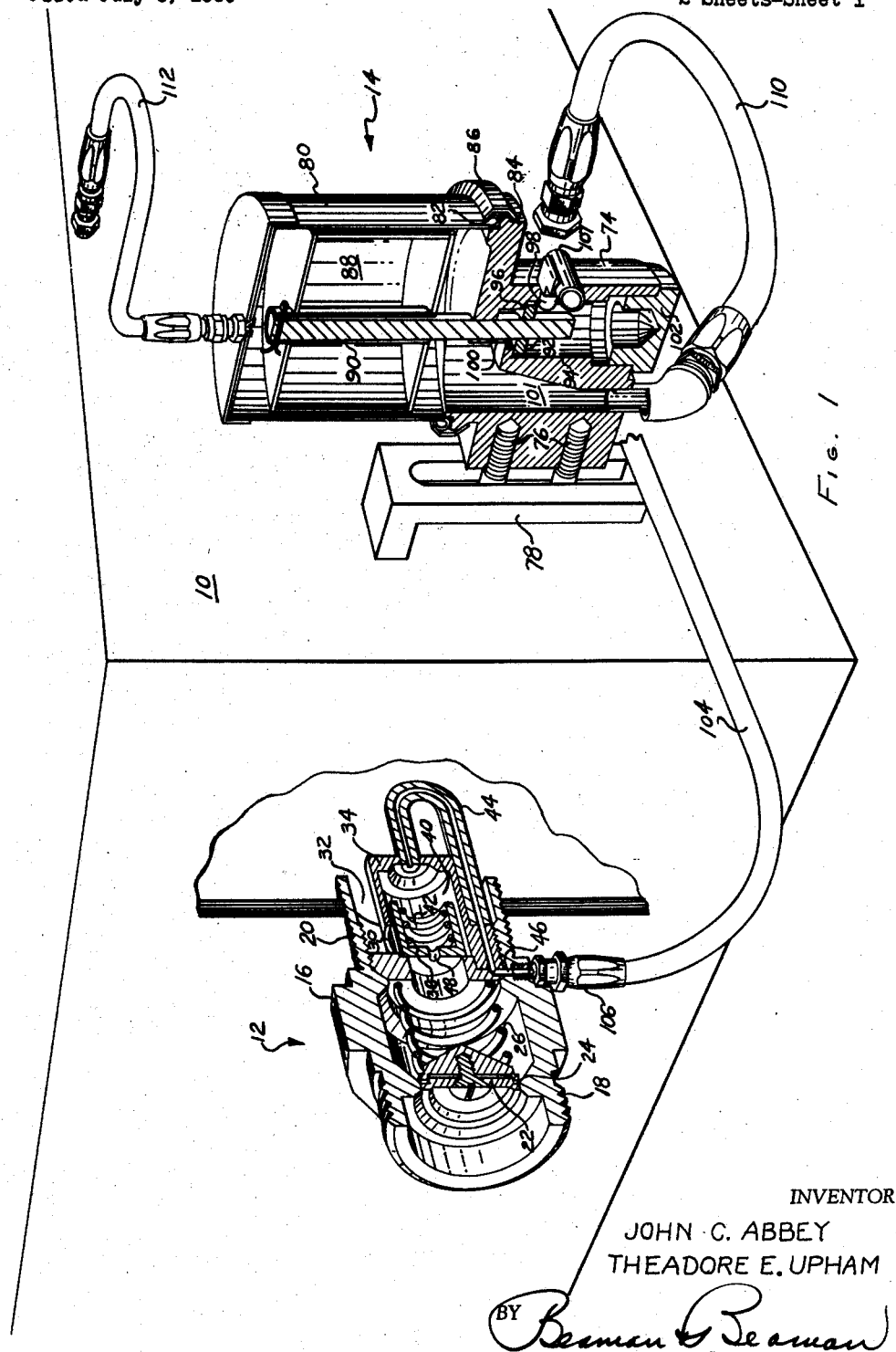

The invention relates to a shut-off valve and particularly pertains to an automatic float controlled valve which may be used in conjunction with fuel lines and tanks such as those employed on diesel locomotives and the like.

It is common practice during the refueling of diesel locomotives for the mechanic to connect the fuel supply line to the fuel tank inlet and permit the tank to fill while attending to other maintenance about the locomotive. As the fuel tank fills, the air within the tank exhausts through vents and a common method of determining when the tank is full is to observe fuel flowing out of the vents. Such an operation is, of course, very wasteful and the resultant fuel spillage is costly, dangerous and harmful to the area surrounding the refueling station, and there have been instances of locomotives being destroyed by fire upon the spillage being ignited. To overcome this problem several devices have been employed, such as placing whistles on the vents. However, spillage will still occur through the whistle and the mechanic must pay close attention to the refueling operation.

It is thus an object of the invention to provide refueling structure for use with vented tanks wherein a shut-off valve responsive to the level of fuel will automatically stop the flow of fuel upon the fuel reaching a pre-determined level within the tank.

A further object of the invention is to provide an automatic shut-off valve in a concise structure wherein a self sealing valve is also employed at the fuel hose coupling location.

Another object of the invention is to provide an automatic shut-off valve for use with a pressurized fuel line wherein the pressure of the fuel is employed to close the valve element.

A further object of the invention is to provide an automatic float operated shut-off valve which does not employ mechanical or electrical linkages and wherein a single float may operate a plurality of valves.

Yet another object of the invention is to provide an automatic shut-off valve for vented tanks which may be readily installed on existing tanks and is capable of a considerable degree of versatility.

These and other objects of the invention arising from the structural details will be apparent from the following description and accompanying drawings wherein, FIG. 1 is a perspective, cross sectional view of the shut-off valve and float as installed on a tank, FIG. 2 is an elevational, partial cross section of the coupling and shut-off valve assembly, FIG. 3 is a partially sectioned elevational view of the hose mounted coupling half and, FIG. 4 is a partially sectioned elevational view of the tank and hose coupling halves in assembled relation.

It will be appreciated that although the shut-off valve, couplings and float of the invention have been referred to, and will be described, as used in conjunction with a fuel tank, the invention may be employed with any type of a tank that is to be filled with a liquid or wherein it is desired to maintain a pre-determined liquid level in a liquid container supplied by a fluid under pressure.

One arrangement of the components comprising the invention is shown in FIG. 1 wherein a fuel storage tank is shown at 10 having a coupling half 12, comprising a valve body, communicating with the interior of the tank. A float assembly 14 may also be mounted directly on the tank. However, the location of the float assembly is not limited to such a supporting arrangement, as will be later apparent. The coupling half 12 and float assembly and the float assembly and the tank may be interconnected by conduits such as rubber hose or tubing and the versatility of such interconnection permits ready installation in existing tank systems, permits many variations in the relationships between the coupling, tank and float assembly components and eliminates any need for mechanical linkages or electrical connections.

The coupling half 12 is best illustrated in FIGS. 1 and 2 and includes a body 16 which is exteriorly threaded at 18 to receive the nut of the other coupling half and threaded at 20 to facilitate connection to the tank 10 or a conduit communicating with the tank. A self sealing valve 22 is movably mounted within a portion of the bore of the coupling half 12 and is urged into a normal sealing relation with an annular seat 24 by a spring 26. Valve 22 is displaced upon connection of the other coupling half to half 12 and prevents the accidental escape of fluid upon coupling or uncoupling of the coupling halves and also prevents the entry of foreign matter into the coupling bore.

A shoulder or seating element 28 is located within the bore of coupling half 12 and a plurality of radial ports 30 communicating with axial passages 32 are located adjacent the annular seat element 28. The ports 30 are defined in a cup-like cylinder 34 which is sealed at the open end with respect to the element 28 and as the cylinder 34 blocks the primary axial bore of the coupling half, all fluid passing through the coupling must pass through the ports 30.

A valve member 36, in the form of a cup-like piston having a base 38, is axially slidable within cylinder 34 and sealing rings may be interposed therebetween or the valve closely fitted to the cylinder to maintain a sliding sealed connection. As will be apparent in FIG. 2, the valve 36 may sealingly engage the seat element 28 to close ports 30 and thereby close the coupling half 12 to fluid flow. A chamber 40 is defined by cylinder 34 and valve 36 and a spring 42 within the chamber normally biases the valve 36 into engagement with seat element 28.

A conduit 44 communicates with chamber 40 and a passage 46 in the coupling body 12 whereby access to the chamber when the coupling half is installed is possible. It will also be noted that an orifice 48 is defined in the base of valve 36 whereby communication between the primary bore of coupling half 12 and chamber 40 is maintained.

At refueling stations for locomotives and the like the fuel is usually transported under pressure through a flexible hose to the fuel tank. In accordance with the invention, the supply hose is provided with a self sealing coupling half 50 as shown in FIGS. 3 and 4. Coupling half 50 includes a body 52 having a tubular sleeve 54 affixed therein in communication with the hose, which is affixed to body 52 by a fitting, not shown, at threads 56. The sleeve 52 is provided with an enlarged head 58 which forms a seat and a plurality of radial ports 60 are formed in the sleeve adjacent the head.

An annular valve 62 circumscribes the sleeve 54, is axially movable within body 52 and is biased toward head 58 by a spring 64. The forward end of valve 62 is provided with a resilient seal to engage head 58 and in the uncoupled position the valve and sleeve assume the relation shown in FIG. 3 to close ports 60. A nut 66 having interior threads for cooperation with threads 18 of coupling half 12 is rotatably affixed on body 52 and axially positioned by a pair of snap rings 68. Handles 70 permit manual rotation of the nut 66 without the use of a wrench.

FIG. 4 illustrates the coupling halves 12 and 50 in the assembled or coupled relation. As the nut 66 is screwed onto threads 18 the end of sleeve 54 abuts the valve 22 and unseats this valve from seat 24. Simultaneously, the valve 62 engages the shoulder 72 of coupling half 12 and the axial movement of coupling half 50 uncovers the ports 60 to establish fluid flow from coupling 52 to coupling 12. As the fluid pressure within coupling half 12 reacts on the base of valve 36 the valve 36 is pushed to the left and permits the fluid to flow through ports 30 and passages 32 into the tank 10.

The valve 36 functions as an automatic shut-off valve and is controlled by the level of the fluid within the tank. The control is effected by the float assembly as described hereinafter.

The float assembly 14 includes a base 74 which is mounted for vertical adjustment by a pair of screws 76 movable within a bracket 78. The float chamber is formed by an inverted cup 80 sealingly engaging the base 74. The cup is preferably formed with a rolled lip 82 and a flange 84 is provided on the base whereby a V type clamp 86 overlapping both the lip and flange maintains a compression on a gasket therebetween to effect a fluid tight seal.

A float 88 is mounted for vertical movement within cup 80 and a control rod 90 extends up through the float and is affixed to the float by a cotter pin.

As will be seen in FIG. 1, the control rod 90 functions as a valve stem and a valve 92 is affixed to the rod. The valve 92 is located within a bore 94 in the base 74 and a shoulder 96 therein functions as a valve seat for the valve 92. An inlet port 98 opens into bore 94 below the valve 92 and an outlet port 100 above the valve connects the bore 94 with an enlarged bore 101 within the base communicating with the chamber defined by cup 80. A plug 102 seals the end of the bore 94.

The coupling and float assembly and the float assembly and the tank are connected by conduits such as hose lines. A bleed-off conduit 104 interconnects the passage 46 with the inlet port 98 by means of fittings 106 and 107. A conduit 110 interconnects the lower region of the tank 10 with the enlarged bore 101 and the conduit 112 interconnects the top of float chamber with the top of tank 10 for reasons explained hereinafter.

The operation of the valves and float is as follows:

After the coupling halves 12 and 50 are coupled as in FIG. 4, the fluid pressure within the coupling half 12 displaces valve member 36 to uncover ports 30 and the tank 10 will begin to fill. As the fuel flows through ports 30, a small portion of the fuel will flow through orifice 48 into chamber 40 and exhaust from chamber 40 into conduit 44, passage 46, conduit 104, inlet port 98, bore 94 and into bore 101 through the outlet port 100 as the float 88 will be in its lowermost position and the valve 92 will be removed from shoulder seat 96. As the tank liquid level rises, a corresponding liquid level will be maintained within the float assemby 14 due to the conduits 110 and 112. The conduit 110 conducts the fuel from the tank to the bore 101 and float chamber and the configuration of bore 101 minimizes turbulence due to fuel entering the float chamber. The conduit 112 prevents a back pressure from building up in the float chamber and as tank 10 is vented to the atmosphere by vents, not shown, equalized pressures within the float chamber and tank are maintained and the liquid level within the float chamber will be exactly the same as that of the tank.

The float assembly 14 is pre-adjusted on bracket 78 whereby upon the fuel within tank 10 reaching the desired level the attendant movement of float 88 and rod 90 will cause the valve 92 to seat upon shoulder 96. At this time the fluid pressure within chamber 40 will accumulate as fluid flow continues through orifice 48 and in a very short time the fluid pressure on both sides of valve base 38 will substantially equalize and the spring 42 shifts the valve 36 toward seat element 28 and closes ports 30, stopping flow into the tank. The nut 66 may now be removed and the coupling halves separated.

The cross sectional area of the orifice 48 is smaller than the area of the conduit system connecting chamber 40 to the float assembly to insure that a false back pressure or premature movement of valve 36 will not occur and hence the shut-off operation will be fully automatic and the fuel tank 10 may be filled without observation by the mechanic.

It is not necessary that the float assembly be mounted on the storage tank itself as the conduit connections permit the float to be located at any desired location with the vertical operating range of the float. It will also be understood that by replacing fitting 107 with a multi-inlet fitting incorporating check valves, a single float may be used to control several automatic valves filling the same tank or by using several conduits 110 connected to separate tanks on the same horizontal plane, a single float may control the filling of several tanks by a plurality of supply lines.

We claim:

1. In combination with a tank for fluids, a device attachable from the exterior of said tank for filling said tank to a pre-determined level, said device comprising an inlet coupling attached to said tank and including an inlet fluid opening disposed on the exterior of said tank, an exterior bleeder orifice, and a discharge opening in communication with the interior of said tank, a spring pressed ported valve shiftably disposed within said coupling covering said discharge opening and forming first and second fluid chambers, said valve being shiftable in response to fluid pressure differential between said chambers to uncover said discharge opening to thereby allow the flow of fluid through said coupling from the exterior to the interior of said tank, means carried by said coupling and forming a fluid path within said coupling from said second chamber to said bleeder orifice, means within said coupling for closing said inlet orifice, regulating apparatus disposed on the exterior of said tank and having means responsive to the fluid level within said tank, and exterior conduit means connecting said apparatus and said bleeder orifice whereby the pressures in said chambers are equalized when the fluid in said tank reaches said pre-determined level.

2. The device of claim 1 wherein said apparatus includes a float chamber, fluid communication means between said apparatus and said tank, a float within said float chamber, a bleed-off valve controlling the flow of the fluid through said exterior conduit means, and means operably interconnecting said bleed-off valve and said float.

References Cited in the file of this patent

UNITED STATES PATENTS

| | | |
|---|---|---|
| 2,384,628 | Krone et al. | Sept. 11, 1945 |
| 2,548,368 | Hartley et al. | Apr. 10, 1951 |
| 2,574,022 | Dahl | Nov. 6, 1951 |
| 2,630,822 | Davies | Mar. 10, 1953 |
| 2,901,008 | Cavett et al. | Aug. 25, 1959 |